(12) United States Patent
Chen et al.

(10) Patent No.: US 9,299,256 B2
(45) Date of Patent: Mar. 29, 2016

(54) REAL-TIME PARKING ASSISTANT APPLICATION

(71) Applicant: GM GLOBAL TECHNOLOGY OPERATIONS LLC, Detroit, MI (US)

(72) Inventors: Lu Chen, Shanghai (CN); Xiaowen Dai, Shelby Township, MI (US); Jiang Du, Beaverton, OR (US); Jeff Wang, Jiangsu (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 387 days.

(21) Appl. No.: 13/867,482

(22) Filed: Apr. 22, 2013

(65) Prior Publication Data

US 2014/0313058 A1    Oct. 23, 2014

(51) Int. Cl.
*G08G 1/00*  (2006.01)
*G08G 1/14*  (2006.01)
*G08G 1/01*  (2006.01)
*H04W 4/04*  (2009.01)

(52) U.S. Cl.
CPC .............. *G08G 1/141* (2013.01); *G08G 1/0112* (2013.01); *G08G 1/0116* (2013.01); *G08G 1/0133* (2013.01); *G08G 1/0141* (2013.01); *G08G 1/143* (2013.01); *G08G 1/144* (2013.01); *G08G 1/146* (2013.01); *G08G 1/148* (2013.01); *G08G 1/00* (2013.01); *H04W 4/046* (2013.01)

(58) Field of Classification Search
CPC ................................ H04W 4/046; G08G 1/00
See application file for complete search history.

(56) References Cited

U.S. PATENT DOCUMENTS

| | | | |
|---|---|---|---|
| 2011/0191019 | A1 | 8/2011 | Holsinger et al. |
| 2011/0285591 | A1 | 11/2011 | Wong |
| 2012/0136997 | A1 | 5/2012 | Yan et al. |
| 2013/0057686 | A1* | 3/2013 | Genc et al. ............. 348/148 |
| 2013/0231824 | A1* | 9/2013 | Wilson et al. .......... 701/26 |

FOREIGN PATENT DOCUMENTS

CN          102436756 A    5/2012

OTHER PUBLICATIONS

Tingxin Yan, et al., CrowdPark: A Crowdsourcing-based Parking Reservation System for Mobile Phones.
Xiao Chen, et al., DIVANet '12: Crowdsourceing for Onstreet Smart Parking.

* cited by examiner

*Primary Examiner* — Shirley Lu

(57) ABSTRACT

A method for communicating parking space availability for a parking facility. A vehicle-based communication link is established between a remote infrastructure and a user interface device. A parking facility is selected utilizing the user interface device. The selected parking facility is communicated to the remote infrastructure from the user interface device via the vehicle-based communication link. Parking space availability within the selected parking facility is determined by the remote infrastructure. The parking space availability of the selected parking facility is communicated from the remote infrastructure to the user interface device. The parking space availability is determined by the remote infrastructure as a function of crowd sourcing data obtained for the selected parking facility, historical parking data of the selected parking facility, parking availability data of parking facilities proximate to the selected parking facility, and direct parking space sensing by a respective parking facility.

26 Claims, 4 Drawing Sheets

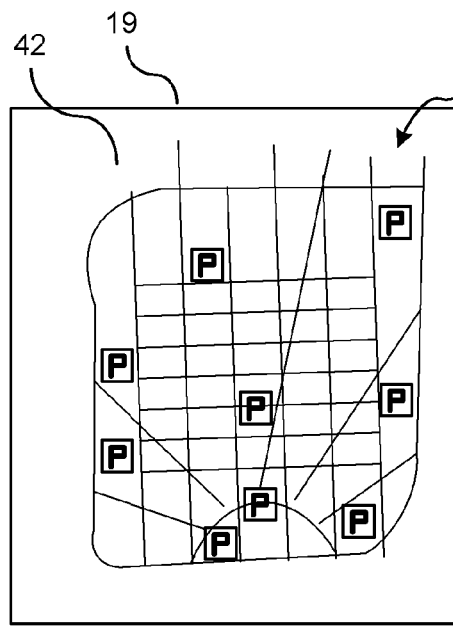
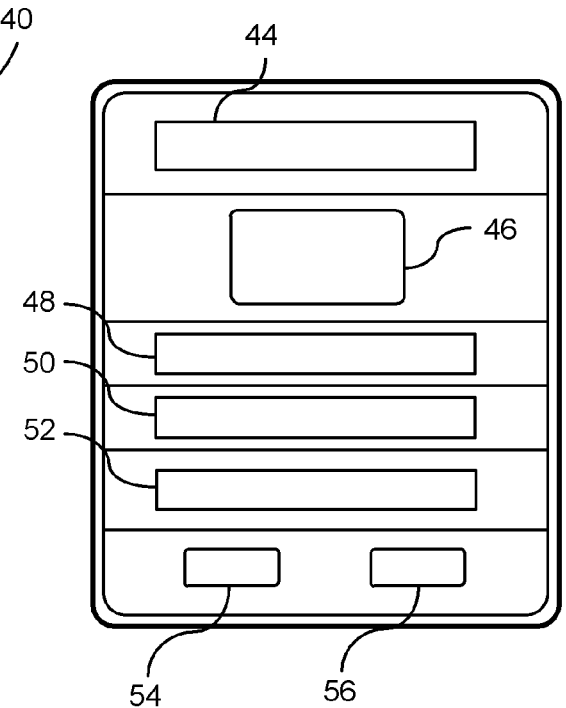
Fig. 3
Fig. 4
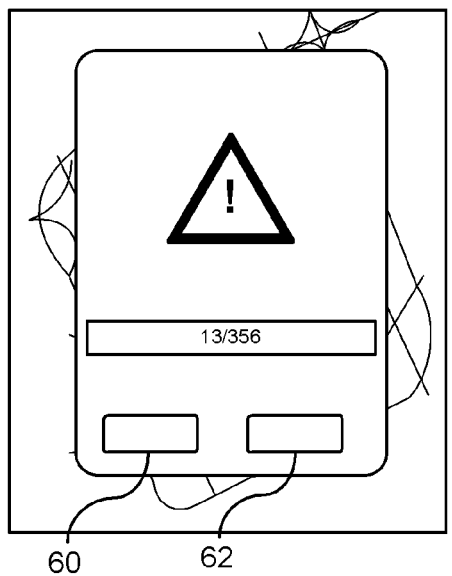
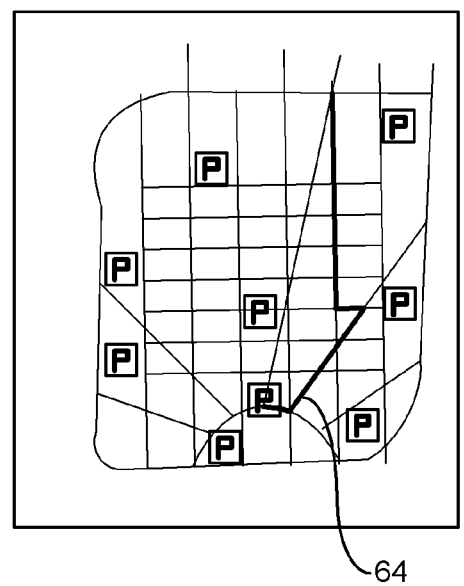
Fig. 5
Fig. 6

REAL-TIME PARKING ASSISTANT APPLICATION

BACKGROUND OF INVENTION

An embodiment relates generally to navigation and information sharing, and more particularly, to location of available parking spaces at parking facilities.

Populated areas such as metropolis cities where populations are dense and parking availability is limited due to the congestion of vehicle impacts drivers stress levels, but also affects environmental concerns and cost concerns. It is well known that finding an available parking spot not only increases the frustration of a driver of a vehicle, but also the continuous searching for an available parking spot increases a driver's drive time which leads to increased cost and reduced fuel efficiency of the vehicle. Moreover, the vehicle operating more that the driver would like, due to the constant circling and re-circling around a designated area trying to find an available parking location results in added emissions in which the vehicle engine is on for an extended amount of time. The issue is that a driver is essentially in the dark of not knowing if a parking location has available parking until the driver actually reaches the parking destination. Upon determining that a parking location is full, the user will aimlessly drive around searching for other parking locations, particularly if the user is unfamiliar with the area, and the designated parking locations.

SUMMARY OF INVENTION

An advantage of an embodiment is notification to the driver of available parking locations when the driver is remote from the respective parking facility. Moreover, the system utilizes input from other entities, in addition to historical data and parking data from nearby parking facilities to estimate parking availability for a facility in which the user does not have direct information regarding a parking facility. The system can either provide known information or provide estimates of a selected parking facility based on attribute data from the other entities.

BRIEF DESCRIPTION OF DRAWINGS

FIG. 3 is a graphical display of a map detailing parking structures for a region of interest.

FIG. 4 is a snapshot of a display screen providing details of a particular parking facility.

FIG. 5 is a graphical illustration of an exemplary notification warning identifying the limited number of parking spaces available, FIG. 6 is a graphical illustration of turn-by-turn directions.

DETAILED DESCRIPTION

Figure 1:
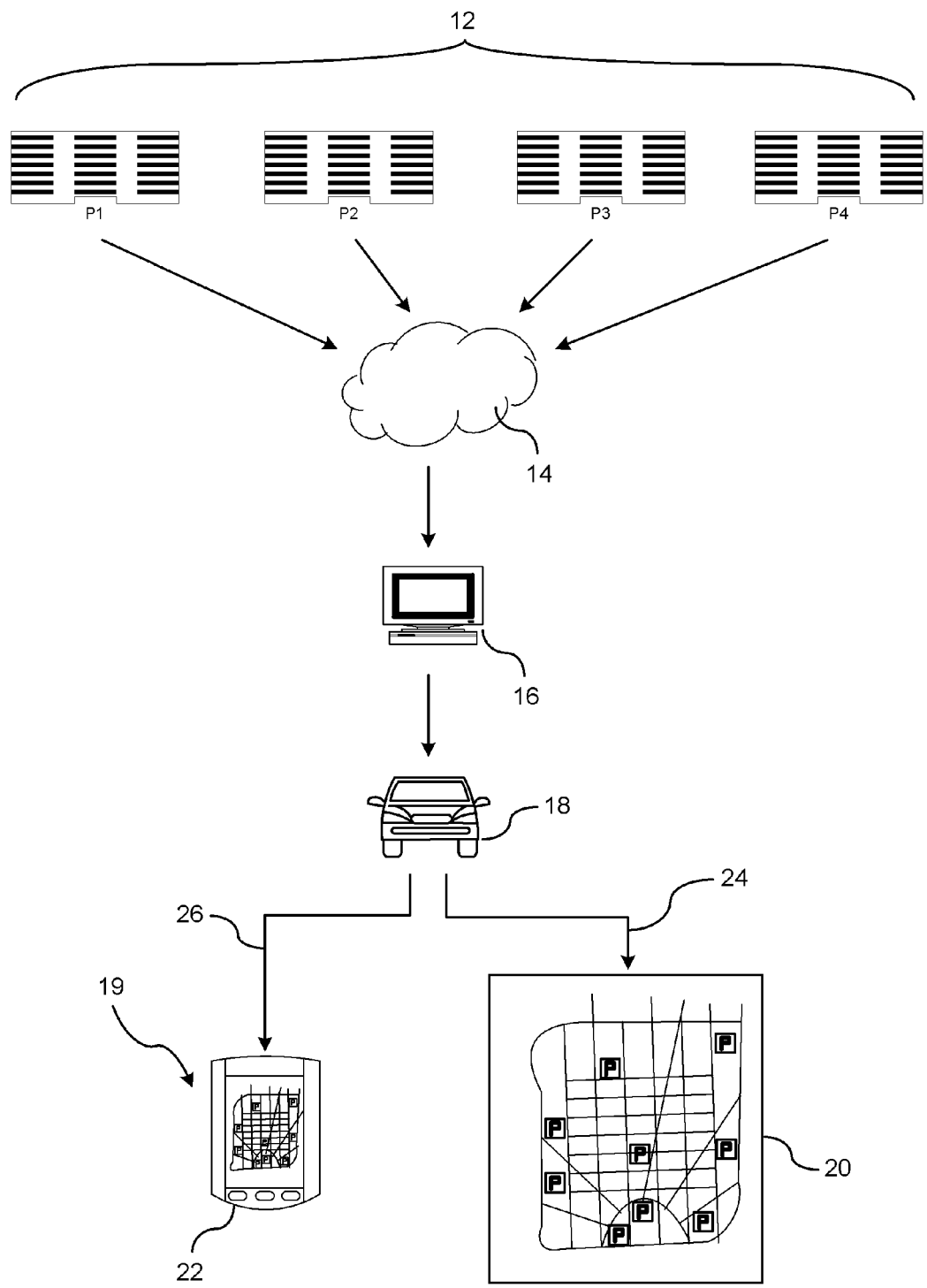
FIG. 1 is a flow diagram for a real-time parking assistant system.

There is shown in FIG. 1 a block diagram for a real-time parking assistant system. The real time parking assist system utilizes inputs from various sources to determining parking availability at a target parking facility. In FIG. 1 a plurality of parking facilities are shown generally at 12. The parking facilities may include a single layer structure or a multi-layered structure. The parking facilities may further include an open area parking lot or a covered lot.

The respective parking facilities may be monitored facilities in which parking spots are formally monitored for parking availability or the respective parking facility may be informally monitored. Formal monitoring of the parking facility may include the facility having sensors or similar that identify when respective parking spaces are available or unavailable. This information is provided to a cloud server 14 for performing cloud computing. In a cloud server model, users are provided access to application software and databases. Cloud providers manage the infrastructure and platforms on which the applications run. End users access the applications on the cloud server 14 through a web browser or mobile application. Cloud computing relies on sharing of resources to attain coherence over a network.

Informally monitored parking data may come from users within the parking facility that wish to share information relating the parking availability of parking spots. For example, other drivers may communicate information relating to the parking availability which is commonly known as crowd sourcing. In addition, a parking attendant who is designated to watch the parking lot may provide such information. This is to the advantage of the parking lot if a parking lot attendant can provide parking availability information relating to the lot so that the lot can be utilized at capacity. Other forms of parking data may be obtained by historical parking data or near-by garage data, or direct sensing of available parking directly by the parking facility. Such data may be tagged as informal or formal monitored parking data.

The information obtained by the cloud server 14 is collected and provided to a remote infrastructure 16, such as a vehicle-based communication service. The vehicle-based communication service 16 may include OnStar® service. OnStar® is a subscription-based communications service currently offered on vehicles manufactured by General Motors that provides service that include, but are not limited to, in-vehicle security, remote diagnostics systems, and turn-by-turn navigation through via a vehicle-based communication unit 18 that provides a wireless communication link between the vehicle and the remote infrastructure 16. Remote services, such as Onstar®, have sufficient computing devices with processing power capability and large memory storage capability to execute statistical and analytical routines of the real-time parking assistant system. The remote infrastructure 16 may obtain a location of a respective parking facility or a general area that the driver desires to park at or nearby. In response to determining a location for parking the vehicle, the vehicle-based communication service 16 communicates parking availability of the parking facilities to the vehicle utilizing the wireless communication link.

The parking facilities 12 and available parking spaces therein are displayed to the driver/user of the vehicle using a user interface device 19. The user interface device may include, but is not limited to, a navigation display device 20 or a portable device 22. The vehicle-based communication unit 18 functions as a wireless communication link for receiving parking space availability data from the remote infrastructure 16 and relaying the data to the user interface device 19. Alternatively, the remote infrastructure 16 may communicate directly with the user interface device 19 without need for communicating through the vehicle-based communication unit 18.

The navigation display device 20 and the portable device 22 include a display screen or other forms or communication that display or provide location of the parking facilities, directions, available parking spaces, cost, and other details.

The navigation device 20 is typically hardwired into the vehicle and communications between the navigation device 20 and the vehicle-based communication service 16 are provided via a communication bus 24.

The portable device 22 may be smartphone that includes a mobile app (e.g., OnStar mobile app) that allows portable device 22 to autonomously communicate directly with the remote infrastructure 16 or via the vehicle-based communication unit 18 by wireless communications 26.

Figure 2:
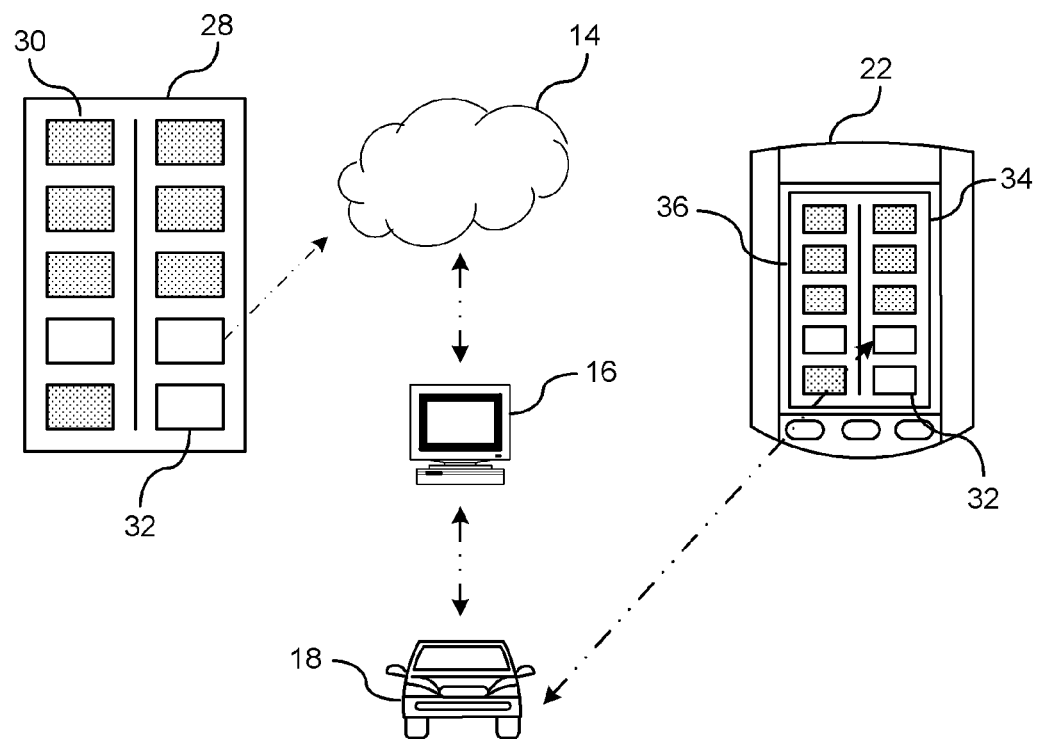
FIG. 2 is a flow diagram conveying parking information on a user interface device.

FIG. 2 illustrates a flow of information conveyed from the parking structure and displayed on the user interface device 19 (e.g., portable device 22). A respective parking facility 28 is shown generally in FIG. 2. The shaded regions 30 illustrate unavailable parking spots within the respective parking facility 28, whereas the unshaded regions 32 illustrate available parking spots. The parking space availability is obtained by respective parking facility 28 monitoring its own spaces or one or more users of the system communicating this information to the cloud server 14. Upon receipt of information communicated to the cloud server 14, the cloud server 14 aggregates and analyzes the data for each parking facility and communicates data to the user notifying the user of available and unavailable parking spaces with the respective parking facility 28. The information is conveyed via the vehicle-based communication-service 16 and vehicle-based communication link 18 to the portable device 22. For the purposes described herein, communications will occur through the vehicle-based communication device 18; however, it should be understood that communications may be performed directly between the vehicle-based communication service 16 and the portable device 22. A graphical illustration 34 of the parking layout of the available/unavailable parking spaces is illustrated on a display screen 36 of the portable device 22. The user can then view a location of both the respective parking structure 28 and available parking spaces 32, and other information such as cost, and determine whether this facility is accessible and desirable to the user for parking the vehicle. It should be understood that the display and information provided to the user is exemplary, and information may be communicated and/or illustrated to the user in different methods without deviating from the scope of the invention.

FIGS. 3-6 illustrate a parking availability App procedure for identifying available parking spots in parking structures. In FIG. 3, a user identifies a destination region where the user desires to park. The destination may be selected by inputting a selected address, a region of interest, intersection, location, tourist attraction, or selecting a location on the display. It should be understood that the methods for selecting a location are only exemplary and techniques other than those described may be used.

In response to selecting a location, a map 40 identifying the various parking facilities and their locations is illustrated on a display screen 42 of the user interface device 19. The various parking facilities are shown as designated with "P" parking symbol. For ease of identifying parking facilities having available parking, the parking symbol "P" may be color coded on the display for identifying available parking, no available parking, or parking availability unknown. For example, a parking symbol "P" with a white background may indicate available parking within the respective facility whereas a parking symbol "P" with a red background may indicate no parking available. In addition, a parking system "P" with a blue background may indicate that exact data is not available, and that the system is utilizing estimates to determine parking availability. It should be understood that the color coding is only one way of presenting information to the user regarding parking availability and that methods other than what is shown may be used to identify parking availability. The user may select a respective parking facility for viewing details of the available parking facility.

FIG. 4 illustrates a snapshot of a display screen for providing details of a particular parking facility. In FIG. 4, label 44 identifies the name of the parking facility. Then name may include the parking facility's name and/or location of the parking facility. Label 46 includes a picture of the parking facility, if available. The picture may help identify the area and structure if the user is unfamiliar with the location of the parking facility.

Label 48 describes attributes of the parking facility. For example, attributes may include, but is not limited to, outdoor, covered, multilevel, easy-out.

Label 50 provides information relating to how many spaces are available out of the allotment of parking spaces. For example, label 50 may describe 152/320. This indicates that there are 320 parking spaces and 152 spaces are available for parking.

Label 52 describes the price to park. This may be identified as a flat fee, a fee per hour, or may include the fee schedule depending on the time of day.

Labels 54 and 56 may include actions that may be taken by the user with respect to the facility. For example, label 54 may include a reservation selection where user selects reservation prompt on the display screen and the selection is transmitted to the vehicle-based communication service wherein the vehicle-based communication service 16 reserves a parking space for the user. As a result, the user need not worry about gathering information for making payments and entering information while driving. The vehicle-based communication service has on record the user's information for reserving and making payment to the parking facility using the stored information.

Label 56 is a selection identifying that the user is interested in the parking facility, but does not want to reserve at this time. The user may request that the vehicle-based communication service maintains this record and updates the user on its availability at periodic intervals or when a condition occurs, such as the number of parking spaces decreasing below a predetermined threshold.

FIG. 5 illustrates notification that is provided to user from the vehicle-based communication service identifying the limited number of parking spaces available at the respective parking facility. For example, if the user is enroute to the parking facility and has previously tagged the parking facility as one of interest that the user desires updates for, then notification is thereafter provided to the user. Notification regarding the respective parking facility includes notices identifying that the parking facility selected by the user has a low amount of parking spaces available (e.g., 12/320). This may be triggered based on the number of spaces decreasing below a predetermined amount of available parking spaces or an amount specified by the user, or may be provided to the user based on a periodic basis.

Options may be provided on the display screen that provide the user with options given the notification update. A first selection 60 may include an option to continue its route to the selected parking facility. A second selection 62 may include a reselection process where a plurality of parking facilities is provided to the user as options from which the user can choose from.

In FIG. 6, a map is displayed to the user identifying end-to-end turn-by-turn navigation directions 64 as typically provided by a navigation unit. The navigation instructions may include a maplet identifying the directions, the turn-by-turn instructions, and/or audio announcements.

As described earlier, if the parking facility does not provide direct input as to the availability of parking spots, then a real-time estimation technique may be used to determine parking availability of a parking facility. The estimation technique estimates a real-time status (S) of the parking facilities that do not supply real-time parking information. Information gathering data may be based on real time rating input as having an empty status, crowded status, or a full status. A user of the system may include a parking facility information update App that allows any user on the network to update a status of a parking facility when the user is at the parking facility. This information can be shared will all others through social networks. Such information gathered is known as crowd sourcing data.

Figure 7:
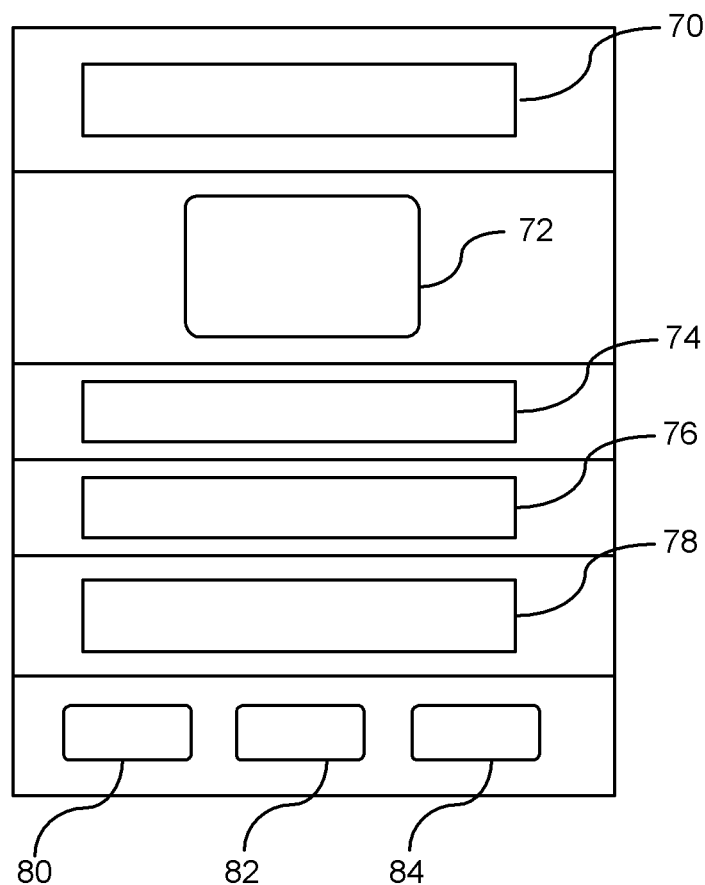
FIG. 7 is a graphical illustration of a display screen for entering parking facility availability data.

FIG. 7 illustrates a snapshot of a display screen for entering parking data relating to a respective facility by a user. Providing details directly from users on a social network is known as crowd sourcing (C). In FIG. 7, label 70 identifies the name of the parking facility. The name may include the parking facility's name and/or location of the parking facility. Label 72 includes a picture of the parking facility, if available.

Label 74 describes attributes of the parking facility. For example, attributes may include, but is not limited to, outdoor, covered, multilevel, easy-out.

Label 76 provides information relating to how many parking spaces the facility may have.

Label 78 describes the pricing to park in the parking facility. This may be identified as a flat fee, a fee per hour, or may include the fee schedule depending on the time of day.

Labels 80, 82, and 84 provide selections in which the user can submit the current status of the facility as observed by the user. For example, label 80 may include a selection which indicates that the user observed the parking structure as "empty". Label 82 may include a selection which indicates that the user observed the parking structure as "crowded". Label 84 may include a selection which indicates that the user observed the parking structure as "full" as observed by the user.

In addition to crowd sourcing data (C), the status (S) of the parking facility is related to near-by parking facilities that are in close proximity to the selected parking structure. Parking availability at facilities in close proximity is a good indication of a parking availability at a respective facility particularly those that have the same attributes as the selected facility. Moreover, historical data (H) derived by analyzing parking availability on same days (e.g., Mondays) and times (11:00 AM) of past dates. For example, if data is collected at the respective parking facility every hour of each day, then the historical data would be a good representation of a current status at the selected parking facility when referenced against a same day and time in the past as parking information should not deviate from its normal flow of parking usage.

A formula for estimating a real time status S of a parking facility may be represented by the following formula:

$$S = \alpha \cdot C + \beta \cdot N + \gamma \cdot H$$

where C is the crowd sourcing data, N is the near-by garage data, H is the historical data, $\alpha$, $\beta$, and $\gamma$ are weighting factors, and where $\alpha + \beta + \gamma = 1$.

Weights may be applied to the various attributes to place greater emphasis on those attributes that are considered more reliable. Historical data which was described as a record of a past timestamp on a same day of the week and a substantially same time of the day is a good reference for the real-time data and the historical data may be considered as the expected value. However, there are variations and emergencies that occur throughout each day that causes variations and may be compensated for. Therefore, near-by garage data N (e.g., data from garages that are within a one-kilometer range) and crowd sourcing data C may be used to provide real-time data. It should be understood that different areas may utilize different range parameters for near-by garage data N. The weights are studied from experimental sampling data. For example, if the most reliable data is the data obtained from historical data H, then greater weight may be applied to the historical data than to crowd sourcing data C or near-by garage data N.

The following is an example of how attributes C, N, and H are determined. The real-time status S is a continuous value which range is [0,1]. Near-by garage data N and historical data H are also continuous values that indicates the occupied percents of the garage and the ranges are also [0,1]. Crowd sourcing data C is a discrete value which the range parameters are {empty, crowded, or full}. For the computation described herein, the describe value must be converted into a continuous value. Parameter {empty} is defined as having a range of [0, P1]. Parameter {crowded} is defined as having a range of [P1, P2]. Parameter full is defined has having a range of [P2, 1]. P1 and P2 are percentage values and can vary to some degree. For example, P1=0.5=50% and P2=0.98=98%. To convert the crowd sourcing data C into a continuous value, conversion factors are established. Parameter empty may have a conversion factor of $$\text{Empty} = \frac{P1}{2};$$

parameter crowded may have a conversion factor of $$\text{crowded} = \frac{P1 + P2}{2};$$

and parameter full may have a conversion factor of $$\text{full} = \frac{1 + P2}{2}.$$

After the respective parameter is selected and the respective conversion factor is applied for determining a continuous factor for the crowd sourcing data, the real-time status S is determined. It should be understood that the formulas for the above attributes are exemplary and that other formula derivations for determining the attributes may be used without deviating from the scope of the invention.

While certain embodiments of the present invention have been described in detail, those familiar with the art to which this invention relates will recognize various alternative designs and embodiments for practicing the invention as defined by the following claims.

What is claimed is:

1. A method for communicating parking space availability for a parking facility comprising:
   establishing a vehicle-based communication link between a remote infrastructure and a user interface device;
   selecting a parking facility utilizing the user interface device, the selected parking facility being communicated to the remote infrastructure from the user interface device via the vehicle-based communication link;
   determining parking space availability within the selected parking facility by the remote infrastructure; and communicating the parking space availability of the selected parking facility from the remote infrastructure to the user interface device;

wherein the parking space availability is determined by the remote infrastructure as a function of crowd sourcing data obtained for the selected parking facility, historical parking data of the selected parking facility, and parking availability data of parking facilities proximate to the selected parking facility.

2. The method of claim 1 wherein each of the crowd sourcing data, historical parking data, and proximate parking facility data are weighted.

3. The method of claim 1 wherein the parking space availability is represented by the following formula:

$$S = \alpha \cdot C + \beta \cdot N + \gamma \cdot H$$

where C is the crowd sourcing data, N is the near-by garage data, H is the historical data, $\alpha$, $\beta$, and $\gamma$ are weighting factors, and where $\alpha+\beta+\gamma=1$.

4. The method of claim 1 wherein parking space availability data is aggregated for a plurality of parking facilities by the remote infrastructure.

5. The method of claim 1 wherein the remote infrastructure utilizes a cloud server for aggregating the parking space availability data of the plurality of parking facilities.

6. The method of claim 1 wherein selecting a parking facility utilizing the user interface device comprises:
  entering a region of interest to the user interface device for identifying parking facilities in proximity to the region of interest;
  displaying a plurality of parking facilities on the user interface device;
  selecting the parking facility from the plurality of parking facilities displayed on the interface device.

7. The method of claim 1 wherein selecting a parking facility of the vehicle utilizing the user interface device includes entering an address of the parking facility on the user interface device.

8. The method of claim 1 further comprising the step of reserving an available parking space at the selected parking facility utilizing the user interface device.

9. The method of claim 1 further comprising the step of requesting parking space availability updates of the selected parking facility.

10. The method of claim 9 wherein requesting parking space availability updates include the remote infrastructure communicating periodic updates to the user interface device.

11. The method of claim 9 wherein requesting parking space availability updates include the remote infrastructure communicating an update to the user interface device in response to a number of available parking spaces within the selected parking facility decreasing below a predetermined threshold.

12. The method of claim 1 wherein the crowd sourcing data is obtained by users submitting parking space availability data of the selected parking facility to the remote infrastructure using a parking space availability application.

13. The method of claim 12 wherein the crowd sourcing data submitted by the user includes an empty parking space availability parameter.

14. The method of claim 13 wherein the empty parking parameter availability parameter is represented by the following formula:

$$\frac{P1}{2},$$

where P1 is a first predetermined percentage less than 50%.

15. The method of claim 12 wherein the crowd sourcing data submitted by the user includes a crowded parking space availability parameter.

16. The method of claim 15 wherein the crowded parking space availability parameter is represented by the following formula:

$$\frac{P1 + P2}{2},$$

where P1 is a first predetermined percentage less than or equal to 50%, and P2 is a second predetermined percentage greater than or equal to 98%.

17. The method of claim 12 wherein the crowd sourcing data submitted by the user includes a full parking space availability parameter.

18. The method of claim 17 wherein the full parking space availability parameter is represented by the determined formula:

$$\frac{1 + P2}{2},$$

where P2 is a second predetermined percentage greater than 98%.

19. The method of claim 1 wherein the historical parking data includes data derived from a past timestamp on a same day of the week and at a same time of the day.

20. The method of claim 1 wherein the parking availability data of parking facilities proximate to the selected parking facility includes data derived from parking structures that are substantially similar in structure to the selected parking facility.

21. The method of claim 1 wherein the parking availability data of parking facilities proximate to the selected parking facility includes data derived from parking structures that are substantially similar in structure to the selected parking facility.

22. The method of claim 1 wherein the user interface device displays an exact location of an available parking space within the selected parking structure.

23. The method of claim 1 wherein the user interface device is an in-vehicle navigation unit.

24. The method of claim 1 wherein the user interface device is a portable device carried by the user.

25. The method of claim 1 wherein the portable device is a smartphone.

26. The method of claim 1 wherein a vehicle-based communication unit provides the communication link between the remote infrastructure and the user interface device.

* * * * *